(12) United States Patent
Wright et al.

(10) Patent No.: US 12,446,800 B2
(45) Date of Patent: Oct. 21, 2025

(54) PHYSICAL ACTIVITY MONITORING SYSTEM

(71) Applicant: MYZONE LIMITED, Isle of Man (GB)

(72) Inventors: David Edward Wright, Isle of Man (GB); Michael Glenn Leveque, Coto de Caza, CA (US)

(73) Assignee: MYZONE LIMITED, Isle of Man (GB)

( * ) Notice: Subject to any disclaimer, the term of this patent is extended or adjusted under 35 U.S.C. 154(b) by 376 days.

(21) Appl. No.: 18/002,059

(22) PCT Filed: Jun. 23, 2021

(86) PCT No.: PCT/EP2021/067214
§ 371 (c)(1),
(2) Date: Dec. 16, 2022

(87) PCT Pub. No.: WO2021/260044
PCT Pub. Date: Dec. 30, 2021

(65) Prior Publication Data
US 2023/0225634 A1    Jul. 20, 2023

(30) Foreign Application Priority Data
Jun. 23, 2020    (GB) .................... 2009563

(51) Int. Cl.
*A61B 5/11*    (2006.01)
*A61B 5/00*    (2006.01)
(Continued)

(52) U.S. Cl.
CPC .......... *A61B 5/1118* (2013.01); *A61B 5/0205* (2013.01); *A61B 5/256* (2021.01);
(Continued)

(58) Field of Classification Search
CPC .......... A61B 5/256; A61B 5/28; A61B 5/332; A61B 5/6823; A61B 5/6824;
(Continued)

(56) References Cited

U.S. PATENT DOCUMENTS

| 10,105,108 B1 | 10/2018 | Taptelis |
| 10,517,536 B1 | 12/2019 | Lusted |

(Continued)

FOREIGN PATENT DOCUMENTS

| CN | 110680306 A | 1/2020 |
| CN | 110811579 A | 2/2020 |

(Continued)

OTHER PUBLICATIONS

International Search Report and Written Opinion mailed Oct. 19, 2021 in International Application PCT/EP2021/067214.
(Continued)

*Primary Examiner* — Paula J Stice
(74) *Attorney, Agent, or Firm* — POLSINELLI LLP

(57) ABSTRACT

A wearable device for monitoring physical activity of a user, the wearable device being reversibly attachable to a chest strap and an arm strap. The wearable device comprises an ECG sensor arranged to collect ECG measurements of the user only when the wearable device is attached to the user's chest by the chest strap, and a PPG sensor arranged to collect PPG measurements of the user when the wearable device is attached to the user's arm or wrist by the arm strap. The wearable device also comprises control circuitry arranged to switch the wearable device between an ECG only mode and a PPG only mode. In the ECG only mode, the control circuitry is configured to control the ECG sensor to collect ECG measurements but prevent the PPG sensor from initiating PPG measurements. In the PPG only mode, the control circuitry is configured to control the PPG sensor to initiate (Continued)

PPG measurements but prevent the ECG sensor from collecting ECG measurements.

15 Claims, 5 Drawing Sheets

(51) Int. Cl.
*A61B 5/0205* (2006.01)
*A61B 5/256* (2021.01)
*A61B 5/28* (2021.01)
*A61B 5/33* (2021.01)
*A61B 5/332* (2021.01)
*A61B 5/024* (2006.01)

(52) U.S. Cl.
CPC ............... *A61B 5/28* (2021.01); *A61B 5/33* (2021.01); *A61B 5/332* (2021.01); *A61B 5/6823* (2013.01); *A61B 5/6824* (2013.01); *A61B 5/6831* (2013.01); *A61B 5/742* (2013.01); *A61B 5/7475* (2013.01); *A61B 5/02416* (2013.01); *A61B 5/02438* (2013.01); *A61B 2560/0214* (2013.01); *A61B 2562/0219* (2013.01)

(58) Field of Classification Search
CPC ............ A61B 5/6831; A61B 5/02438; A61B 2560/0443; A61B 5/681
See application file for complete search history.

(56) References Cited

U.S. PATENT DOCUMENTS

| | | |
|---|---|---|
| 2012/0203077 A1 | 8/2012 | He et al. |
| 2015/0135310 A1 | 5/2015 | Lee |
| 2015/0157220 A1 | 6/2015 | Fish et al. |
| 2015/0265217 A1 | 9/2015 | Penders et al. |
| 2015/0335283 A1 | 11/2015 | Fish et al. |
| 2016/0192716 A1 | 7/2016 | Lee |
| 2016/0192856 A1 | 7/2016 | Lee |
| 2016/0206212 A1 | 7/2016 | Lee et al. |
| 2016/0252888 A1 | 9/2016 | Kim et al. |
| 2016/0313176 A1 | 10/2016 | Lee |
| 2017/0000359 A1 | 1/2017 | Kohli et al. |
| 2017/0007183 A1 | 1/2017 | Dusan et al. |
| 2017/0014037 A1 | 1/2017 | Coppola et al. |
| 2017/0060298 A1 | 3/2017 | Hwang et al. |
| 2017/0105633 A1 | 4/2017 | Shin |
| 2017/0169190 A1 | 6/2017 | Harma et al. |
| 2017/0209053 A1 | 7/2017 | Pantelopoulos et al. |
| 2017/0224236 A1 | 8/2017 | Ho et al. |
| 2017/0273584 A1 | 9/2017 | Huang et al. |
| 2017/0273620 A1 | 9/2017 | Wiggins et al. |
| 2018/0042502 A1 | 2/2018 | Wang et al. |
| 2018/0085058 A1 | 3/2018 | Chakravarthi et al. |
| 2018/0092554 A1 | 4/2018 | Zhang et al. |
| 2018/0103901 A1 | 4/2018 | Gandhi et al. |
| 2018/0229674 A1 | 8/2018 | Heinrich et al. |
| 2018/0256048 A1 | 9/2018 | Shimuta |
| 2018/0279952 A1 | 10/2018 | Orron et al. |
| 2018/0279953 A1 | 10/2018 | Wang et al. |
| 2018/0303353 A1 | 10/2018 | Baxi et al. |
| 2019/0000332 A1 | 1/2019 | Li et al. |
| 2019/0015041 A1 | 1/2019 | Chung et al. |
| 2019/0133516 A1 | 5/2019 | Banet et al. |
| 2019/0196411 A1 | 6/2019 | Yuen |
| 2019/0269914 A1 | 9/2019 | Moaddeb et al. |
| 2019/0290147 A1 | 9/2019 | Persen et al. |
| 2019/0320916 A1 | 10/2019 | Banet et al. |
| 2019/0373962 A1 | 12/2019 | Datta et al. |
| 2020/0037954 A1 | 2/2020 | Hassan-Ali et al. |
| 2020/0042036 A1 | 2/2020 | Connor |
| 2020/0100693 A1 | 4/2020 | Velo |
| 2022/0142547 A1 | 5/2022 | Tong et al. |

FOREIGN PATENT DOCUMENTS

| | | |
|---|---|---|
| EP | 3626159 A1 | 3/2020 |
| GB | 2567522 A | 4/2019 |
| WO | 2011032132 A2 | 3/2011 |
| WO | 2016055853 A1 | 4/2016 |
| WO | 2018025199 A1 | 2/2018 |
| WO | 2018233625 A1 | 12/2018 |
| WO | 2019168474 A1 | 9/2019 |
| WO | 2020031104 A1 | 2/2020 |

OTHER PUBLICATIONS

Office Action dated Dec. 18, 2020 in United Kingdom Application GB2009563.4.

PHYSICAL ACTIVITY MONITORING SYSTEM

CROSS-REFERENCE TO RELATED APPLICATIONS

The present application is a U.S. National Phase Application under 35 U.S.C. § 371 of International Application PCT/EP2021/067214, filed on Jun. 23, 2021, which claims the benefit of priority to United Kingdom Patent Application 2009563.4 filed on Jun. 23, 2020, both of which are incorporated herein by reference in their entireties.

TECHNICAL FIELD

The present disclosure relates to a physical activity monitoring system and particularly, although not exclusively, to a wearable device for monitoring physical activity of a user.

BACKGROUND

Physical fitness is important for health and wellbeing. Regular exercise and physical activity can improve respiratory, and cardiovascular health, reduce the risk of heart disease, some cancers and Type 2 diabetes, and can also help in maintaining a healthy weight.

In recent years, wearable fitness or activity trackers have become popular. These activity trackers use sensors to track a user's activity and inactivity, and can motivate users to be more active. They can also help users to measure progress towards a fitness goal, to exercise more effectively, and to understand their overall health. Activity trackers can have a variety of different functions, including determining step count, distance travelled, altitude, calories burned and vital signs including pulse, heart rate, heart rate variability, skin temperature and level of perspiration.

Activity trackers are often worn on the wrist, e.g. a smartwatch. They can include an optical blood flow sensor, such as a photoplethysmogram (PPG) sensor. These sensors use flashing LEDs to penetrate the user's skin and detect blood flow, and therefore pulse and heart rate.

Heart rate monitors can also be included in chest-based devices. Chest-based devices often include electrocardiogram (ECG) sensors, which monitor heart rate using detected electrical signals of the heart.

Wrist-based activity trackers, such as smart-watches, can be considered more convenient, discrete and easier to wear than chest-based devices. However, it is known that wrist-based devices comprising PPG sensors can be inaccurate, due to motion artifact (e.g. from the user moving), or sweating. Another problematic issue results from the location of the device, because as the blood moves away from the heart to the wrist, it slows to a lower rate. Therefore, wrist-based devices using PPG sensors can provide inaccurate readings.

Some wrist-based devices incorporate both a PPG sensor and an ECG sensor. These devices can use both PPG measurements and ECG measurements to verify heart rate measurement data, in an attempt to provide more accurate heart rate data. For example, US 2019/0196411 A1 proposes a smartwatch assembly comprising a wrist strap, and an insert device that includes both a PPG sensor and an ECG sensor. The PPG sensor continuously obtains PPG measurements. If the PPG sensor detects a trigger event (e.g. an abnormal heart function event) from the user's wrist, the insert device automatically triggers the ECG sensor to initiate an ECG measurement from the user's wrist in order to verify, or confirm, the trigger event. US 2019/0196411 A1 also proposes that, based on the verified trigger event, if the user then wants to take a more accurate ECG measurement, they can remove the insert device including the PPG and ECG sensors from the wrist strap, and insert it into a chest strap, to obtain a more accurate ECG measurement from the user's chest.

However, the present inventors have found that by continuously initiating PPG measurements, ECG measurements and PPG measurements are initiated simultaneously, and simultaneous measurement by both a PPG sensor and an ECG sensor from a user's wrist leads to undesirable reduced measurement accuracy. This is due to increased noise and interference, in particular as a result of motion artifact. In such devices, accidental triggering and false readings are undesirably high.

The present invention has been devised in light of the above considerations.

SUMMARY OF THE INVENTION

According to a first aspect, there is provided a wearable device for monitoring physical activity of a user, the wearable device being reversibly attachable to a chest strap and an arm strap, the wearable device comprising:
  an ECG sensor arranged to collect ECG measurements of the user only when the wearable device is attached to the user's chest by the chest strap;
  a PPG sensor arranged to collect PPG measurements of the user when the wearable device is attached to the user's arm or wrist by the arm strap; and
  control circuitry arranged to switch the wearable device between an ECG only mode and a PPG only mode, wherein:
    in the ECG only mode, the control circuitry is configured to control the ECG sensor to collect ECG measurements but prevent the PPG sensor from initiating PPG measurements; and
    in the PPG only mode, the control circuitry is configured to control the PPG sensor to initiate PPG measurements but prevent the ECG sensor from collecting ECG measurements.

In this way, the ECG sensor is turned off (e.g. deactivated) when the wearable device is not attached to the user's chest by the chest strap. Furthermore, the wearable device can turn off (e.g. deactivate) the PPG sensor when the wearable device is in the ECG only mode. The present inventors have found that the ability to manually control and therefore turn off the PPG sensor when the wearable device is worn on the chest, improves measurement accuracy compared to devices in which there is no function to switch off the PPG sensor. Similarly, the ability to turn off the ECG sensor when the wearable device is not attached to the user's chest by the chest strap, and is instead worn on the arm/wrist, for example, improves measurement accuracy compared to devices in which there is no function to turn off the ECG sensor. Furthermore, operating only one sensor at a given time (i.e. by not operating the ECG and PPG sensor simultaneously), helps to conserve power and therefore battery life of the wearable device.

In the ECG only mode, when the wearable device is attached to the user's chest by the chest strap, the PPG sensor does not collect PPG measurements of the user, and so noise or interference which would otherwise have resulted from the PPG sensor collecting PPG measurements from the user's chest, is reduced. More accurate ECG measurements can therefore be obtained from the user's chest.

Similarly, in the PPG only mode, when the wearable device is attached to the user's arm or wrist by the arm strap, the ECG sensor does not collect ECG measurements of the user, and so noise or interference which would otherwise have resulted from the ECG sensor collecting ECG measurements from the user's wrist or arm, e.g. as a result of motion artifact, is reduced. More accurate PPG measurements can therefore be obtained from the user's wrist or arm.

Switching the wearable device between operating in an ECG only mode, such that only ECG measurements are initiated, when the wearable device is attached to the user's chest by the chest strap, and a PPG only mode, such that only PPG measurements are initiated, when the wearable device is attached to the user's arm or wrist by the wrist strap, therefore results in improved accuracy of the measurements, compared to devices in which there is no function to switch off the respective sensor. Furthermore, the possibility of accidental triggering of ECG measurements from the user's wrist is eliminated compared to devices in which ECG measurements from a user's wrist are automatically triggered based on PPG measurements from the user's wrist. The possibility of accidental triggering of PPG measurements from the user's chest is also reduced.

Optional features will now be set out. These are applicable single or in any combination with any aspect.

The wearable device may be configured to operate only in the ECG only mode, the PPG only mode, or a standby mode in which neither the ECG sensor nor the PPG sensor are operable to collect measurements from the user.

In the ECG only mode, the control circuitry may be configured to control the ECG sensor to periodically collect ECG measurements (e.g. every 10 seconds, 15 second, 30 seconds, 1 minute). In the PPG only mode, the control circuitry may be configured to control the PPG sensor to periodically initiate PPG measurements (e.g. every 10 seconds, 15 second, 30 seconds, 1 minute). Alternatively, the control circuitry may be configured to control the ECG/PPG sensors to initiate the respective measurements continuously, in the respective operating mode.

The control circuitry may be arranged to switch the wearable device between the ECG only mode and the PPG only mode based on a user input.

In particular, the wearable device may further comprise a user-operated hardware interface arranged to activate the PPG only mode. For example, the user-operated hardware interface may be arranged to switch the wearable device from the standby mode to the PPG only mode.

The user-operated hardware interface may also be arranged to deactivate the PPG only mode (e.g. to switch the wearable device from the PPG only mode to the standby mode). Alternatively/additionally, the control circuitry may be configured to deactivate the PPG only mode after a predetermined period of non-use. For example, the control circuitry may be configured to switch the wearable device from the PPG only mode to the standby mode after a predetermined period of time has elapsed since a previous collection of a PPG measurement. The predetermined period of time may be between 2 and 10 seconds, more preferably 5 seconds, for example.

As used herein, the term user-operated hardware interface is to be understood as a physical, spatial interface that can be manually operated by the user to switch, or toggle, the wearable device into (and, optionally, out of) the PPG only mode.

The control circuitry may be arranged to only activate the PPG only mode in response to a (manual) user input received via the user-operated hardware interface.

In the ECG only mode, the ECG sensor may be arranged to collect ECG measurements of the user via one or more external ECG skin contacts, wherein the external ECG skin contacts are external to the wearable device. The external ECG skin contacts may be provided on the chest strap.

When the ECG sensor is attached to the user's chest by the chest strap, the ECG sensor may be arranged to contact the external ECG skin contact(s) on the chest strap in order to collect the ECG measurements. Specifically, the ECG sensor may comprise one or more (preferably two) terminal pins for collecting the ECG measurements, e.g. by contacting the external ECG skin contact(s) on the chest strap.

In this way, the ECG sensor is only able to collect ECG measurements when the wearable device is attached to the user's chest by the chest strap. The ECG sensor may be arranged to automatically collect ECG measurements when the wearable device is attached to the user's chest by the chest strap, e.g. by detecting the contact between the terminal pins of the ECG sensor and the external ECG skin contacts. Therefore, as used herein, the term ECG sensor is to be understood as being a device, module, machine or subsystem containing electrical circuitry for collecting and detecting ECG measurements from skin contacts (e.g. skin-contacting electrodes), wherein the skin contacts may be external to the sensor itself.

In this way, the user has full control over switching, e.g. toggling, the wearable device between the ECG only mode and the PPG only mode, and so the possibility of accidental triggering or false readings is reduced. As such, in order to switch the wearable device into the ECG only mode, the user can simply attach the wearable device to their chest using the chest strap (and therefore electrically contact the external ECG contact(s) on the chest strap with the terminal pin(s) of the ECG sensor in the wearable device), and when the wearable device is attached to the user's wrist or arm by the arm strap, the user can switch the operating mode of the wearable device to the PPG only mode using the user-operated hardware interface.

The user-operated hardware interface may be a button, such as a push-button, a switch, a toggle, a knob, a slider, a touch-screen display, or a combination thereof.

One or more skin contacts of the PPG sensor, may be exposed through a first side of the wearable device, e.g. through a rear of the wearable device. The terminal pin(s) of the ECG sensor may also be exposed through this same first side of the wearable device, e.g., through the rear of the wearable device.

The user-operated hardware interface may be provided on a second side of the wearable device different to the side of the wearable device through which the one or more skin contacts of the PPG sensor (and optionally, the terminal pin(s) of the ECG sensor) are exposed.

For example, the user-operated hardware interface may be provided on the front of the wearable device (where the front of the wearable device is the opposing side of the wearable device to the rear of the wearable device). Alternatively, the user-operated hardware interface may be provided on a transverse side/edge of the wearable device (wherein the transverse edge(s) of the wearable device extend between the front and rear of the wearable device). In this way, the user is able to easily access the user-operated hardware interface when the wearable device is attached to the user's wrist/arm.

The wearable device may comprise a power source, such as a battery. The power source may be a rechargeable power source, such as a rechargeable battery. The wearable device may comprise a charging connection for connection to an external power supply for recharging of the power source within the wearable device. The terminal pin(s) of the ECG sensor may comprise the charging connection. Alternatively/additionally, the charging connection may be a USB port, for example. The battery may be a 70 mAh battery, having 70 hours of PPG battery life or 120 hours of ECG battery life.

The wearable device may comprise one or more visual feedback elements, for example one or more lights e.g. one or more LEDs. The visual feedback element(s) may provide visual feedback to a user indicating that the wearable device is operating in the PPG only mode and/or that the PPG only mode is activated. In this way, the user can be made aware of the present operating mode of the wearable device, and/or whether activation of the PPG only mode using the user-operated hardware interface is successful. Optionally, the visual feedback element(s) may be configured to provide visual feedback to a user indicating that the device is operating in the ECG only mode.

Alternatively/additionally, the wearable device may comprise a display, such as an LCD screen, for providing the visual feedback to the user.

The control circuitry may be configured to identify the operating mode of the wearable device (e.g. whether the wearable device is operating in the ECG only mode or the PPG only mode), and control the one or more visual feedback elements based on the operating mode identified. For example, the wearable device may comprise a single LED, and the control circuitry may be configured to control the single LED to output a different colour light based on the operating mode identified, e.g. to output red light when the wearable device is operating in the ECG only mode, and green light when the wearable device is operating in the PPG only mode.

The wearable device may further comprise a movement detection unit, such as an accelerometer and/or a gyroscope, for detecting movement of the wearable device. The movement detection unit may be configured to determine/estimate a user's step count, altitude climbed, and/or distance travelled, for example, based on the detected movement of the wearable device.

The wearable device may further comprise a storage unit operatively connected to the control circuitry. The storage unit may include non-volatile memory, for example flash memory.

The storage unit may be configured to store ECG and/or PPG measurements collected by the ECG and PPG sensors. The storage unit may additionally be configured to store movement data detected by the movement detection unit.

The wearable device may comprise a wireless interface configured to wirelessly communicate with one or more external devices, such as a mobile device and/or an external receiver station. In particular, the wireless interface may be configured to transmit ECG and/or PPG measurements of the user detected by the ECG and PPG sensor, respectively, to the external device, and for example, to an application installed on a mobile device. The wireless communication between the wireless interface and the external device may be via Bluetooth™, ANT+, or WiFi™, for example. The wireless interface may also be configured to communicate wirelessly with a remote server.

The wearable device may be configured to continuously transmit data (e.g. ECG and/or PPG measurements) via the wireless interface to the external device, when the wearable device is within a predetermined range of the external device. Alternatively, the wearable device may transmit data periodically.

In further embodiments, the wearable device may alternatively/additionally be configured to transmit data to the external device via a wired interface (e.g. instead of or in addition to via the wireless interface).

In some embodiments, the wearable device, and in particular the control circuitry, may be configured to determine user activity, exercise intensity and/or indications of a heart function, such as heart rate value, or heart rate recovery value, of the user based on the ECG and/or PPG measurements. These heart functions indications may be stored in the storage unit and/or transmitted to the external device via the wireless interface.

The wearable device may comprise one or more securing mechanisms for reversibly attaching/locking the wearable device to the chest strap and the arm strap.

The terminal pin(s) of the ECG sensor may be for reversibly attaching/locking the wearable device to the chest strap. In this way, the terminal pin(s) of the ECG sensor provided on the wearable device may have three uses; for ECG measurement data transfer (e.g. collecting ECG measurements from the external ECG skin contacts on the chest strap), for mechanically attaching the wearable device to the chest strap, and for providing the charging connection for connection to an external power supply for recharging of the power source within the wearable device.

In a second aspect, there is provided a physical activity monitoring system, comprising:
 the wearable device of the first aspect;
 a chest strap; and
 an arm strap, wherein the wearable device is reversibly attachable to the chest strap and the arm strap.

The chest strap may comprise the one or more external ECG skin contacts for contacting the user's chest. When the wearable device is attached to the chest strap, the external ECG skin contacts may contact (e.g. touch) the terminal pin(s) of the ECG sensor provided on the wearable device. The terminal pin(s) may mechanically fix the wearable device to the chest strap (e.g. as a snap-button fastener). In alternative embodiments, the wearable device may be reversibly attachable to the chest strap via a snap-fit or screw-fit connection The wearable device may be reversibly attachable to the arm strap via a snap-fit connection. Alternatively, the wearable device may be reversibly attachable to the arm strap via a screw-fit connection.

Optionally, the arm strap may comprise a frame for receiving the wearable device. The frame may be configured to receive the wearable device, such that there is a snap engagement between the wearable device and the frame of the arm strap. In some embodiments, the frame and/or the wearable device may comprise one or more securing mechanisms for reversibly locking the wearable device to the frame. The securing mechanisms may comprise complementary protrusions and grooves, for example. The protrusions and grooves may interlock when the wearable device is received in the frame of the arm strap, to reversibly attach the wearable device into the frame.

The chest strap may be sized to extend around a user's chest. The chest strap may therefore be configured to attach the wearable device to the user's chest when the wearable device is attached to the chest strap. The chest strap may comprise one or more complementary snap-button fastener (e.g. popper recess) for receiving a terminal pin of the ECG sensor of the wearable device, in order to fasten/lock the wearable device to the chest strap.

The arm strap may be a forearm strap or a wrist strap. For example, if the arm strap is a wrist strap, the wrist strap may be sized to extend around a user's wrist. The wrist strap may therefore be configured to attach the wearable device to the user's wrist when the wearable device is attached to the wrist strap.

The wearable device, the arm strap and/or the chest strap may be sweat and water resistant, or waterproof.

The physical activity monitoring system may further comprise one or more external devices, such as a mobile device, and/or an external receiver station, having an application installed thereon. The wearable device may be configured to wireless communicate with the application (e.g. via the wireless interface of the wearable device). The wireless communication may be two-way communication. The wearable device may be configured to transmit the PPG and/or ECG measurements collected by the PPG/ECG sensors to the application, and the application may be configured to determine user activity, intensity of exercise, and/or indications of the heart function of the user (e.g. heart rate value or heart rate recovery value) based on the PPG/ECG measurements received from the wearable device. Alternatively/additionally the wearable device itself may be configured to determine indications of the heart rate function, user activity and/or intensity of exercise, and may transmit these determined indications of the heart rate function to the application installed on the mobile device and/or the external receiver station. The external device may display the determined indications of the heart rate function to the user via a screen of the external device (e.g. screen of the mobile device).

In a third aspect, there is provided a method of monitoring physical activity using the wearable device of the first aspect, the method comprising:
  switching the wearable device to the ECG only mode only when the wearable device is attached to the user's chest by the chest strap; and
  switching the wearable device to the PPG only mode when the wearable device is attached to the user's arm or wrist by the arm strap.

In this way, the wearable device collects ECG measurements only from the user's chest (i.e. no PPG measurements are collected from the user's chest), and collects PPG measurements only from the user's wrist/arm (i.e. no ECG measurements are collected from the user's wrist/arm). Improved accuracy of the measurements is thus provided.

The step of switching the wearable device to the PPG only mode may be in response to a user input via the user-operated hardware interface of the wearable device, e.g. the push-button.

The step of switching the wearable device to the ECG only mode may be in response to the wearable device being attached to the user's chest using the chest strap.

In a fourth aspect, there is provided a computer-readable medium having computer executable instructions stored thereon configured to cause a computer, and more particularly the control circuitry of the wearable device, to perform the method of the third aspect.

In a fifth aspect, there is provided a method of using the physical activity monitoring system of the second aspect, the method comprising:
  attaching the wearable device to the arm strap and switching the wearable device to the PPG only mode using a user-operated hardware interface of the wearable device;
  removing the wearable device from the arm strap; and
  attaching the wearable device to the chest strap and attaching the chest strap to the user's chest to switch the wearable device into the ECG only mode.

The method may further comprise, after the step of attaching the wearable device to the arm strap and switching the wearable device to the PPG only mode, attaching the arm strap to the user's arm or wrist to collect PPG measurements only from the user's wrist/arm.

The invention includes the combination of the aspects and preferred features described except where such a combination is clearly impermissible or expressly avoided.

SUMMARY OF THE FIGURES

Embodiments and examples illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art.

Figure 1A:
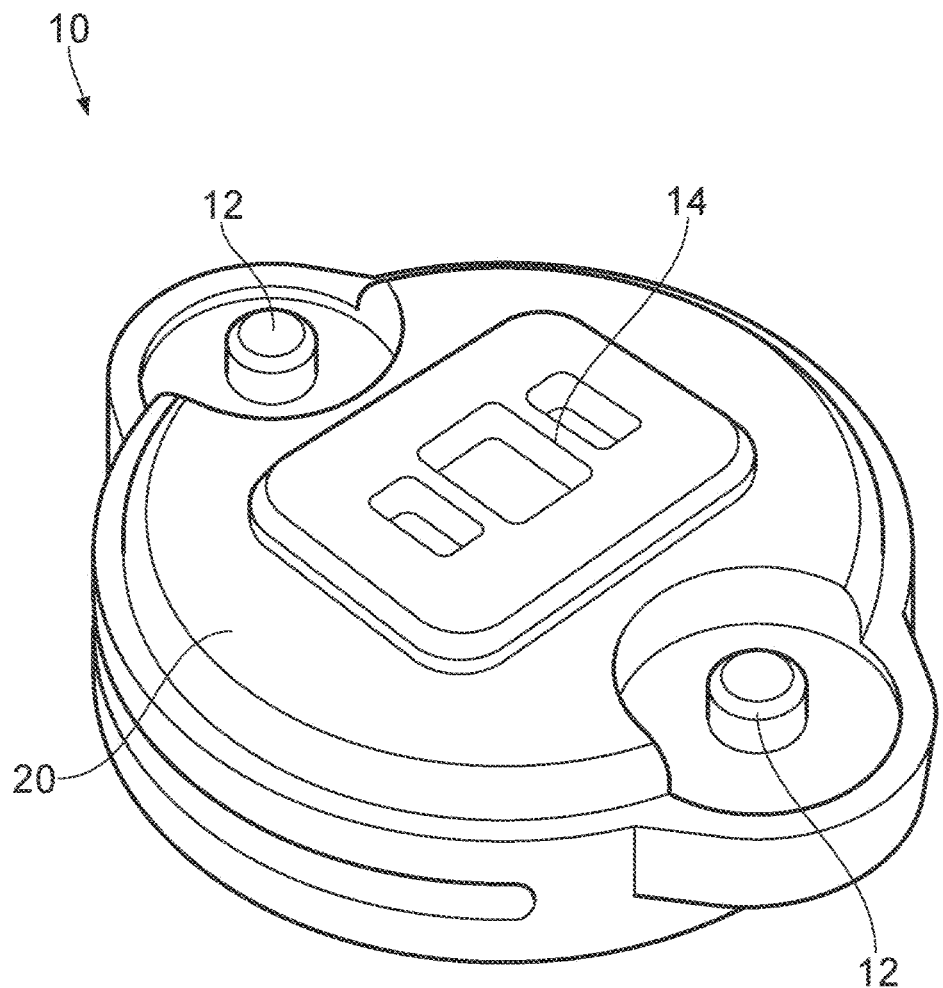
FIG. 1A is a perspective view of a wearable device for monitoring physical activity of a user.
Figure 1B:
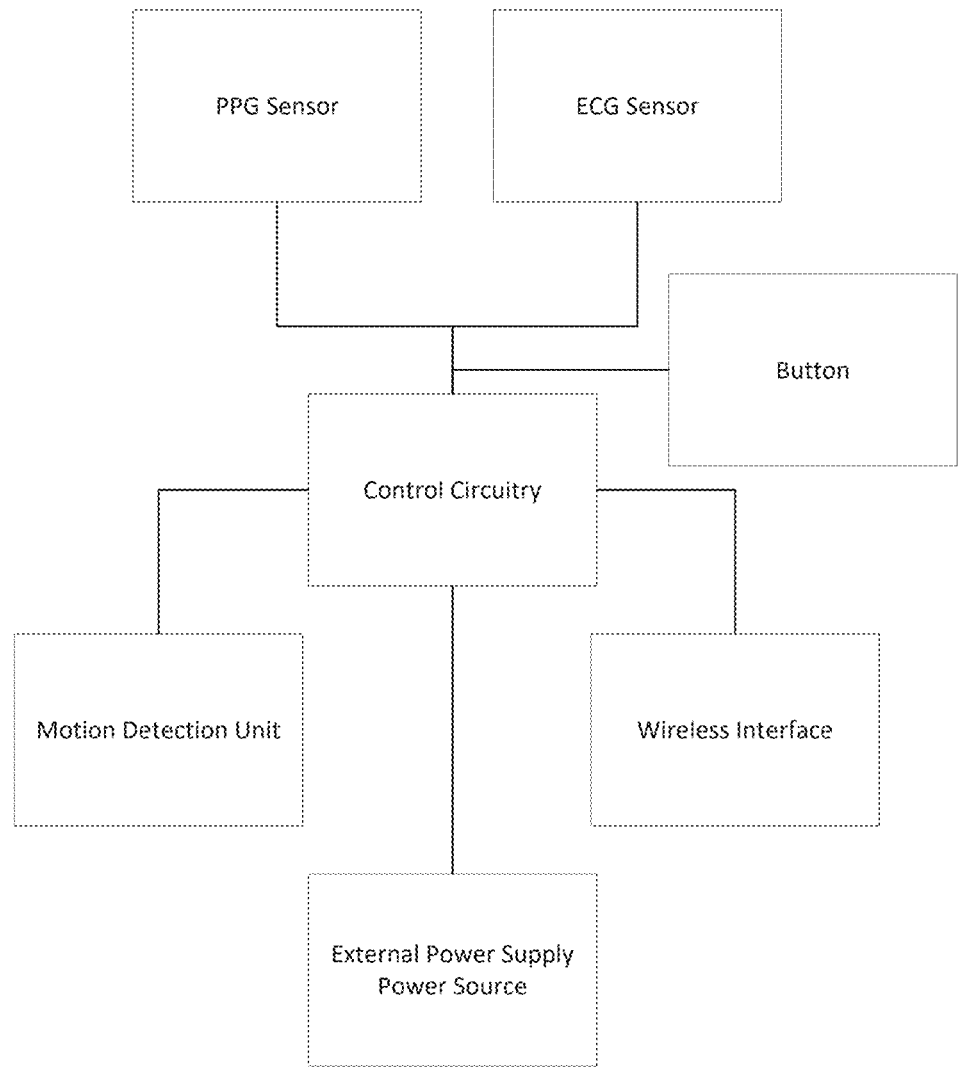
FIG. 1B is a block diagram of components of the wearable device.

FIGS. 1A and 1B shows a wearable activity monitoring device 10 comprising a PPG sensor and an ECG sensor for collecting PPG measurements and ECG measurements from a user, respectively. Skin contact 14 of the PPG sensor is exposed through a side of the wearable device 10, specifically a rear side 20 of the wearable device 10. In use, the rear side 20 of the wearable device is placed in contact with a user's skin, and in particular a user's wrist, such that the contact 14 of PPG sensor is in contact with the user's skin to take PPG measurements of the user.

The wearable device 10 also comprises terminal pins 12 for collecting ECG measurements from external ECG skin contacts. The terminal pins 12 are also exposed through the rear side 20 of the wearable device. However, in alternative embodiments, the terminal pins 12 may be exposed through another side of the wearable device 10.

Figure 2A:
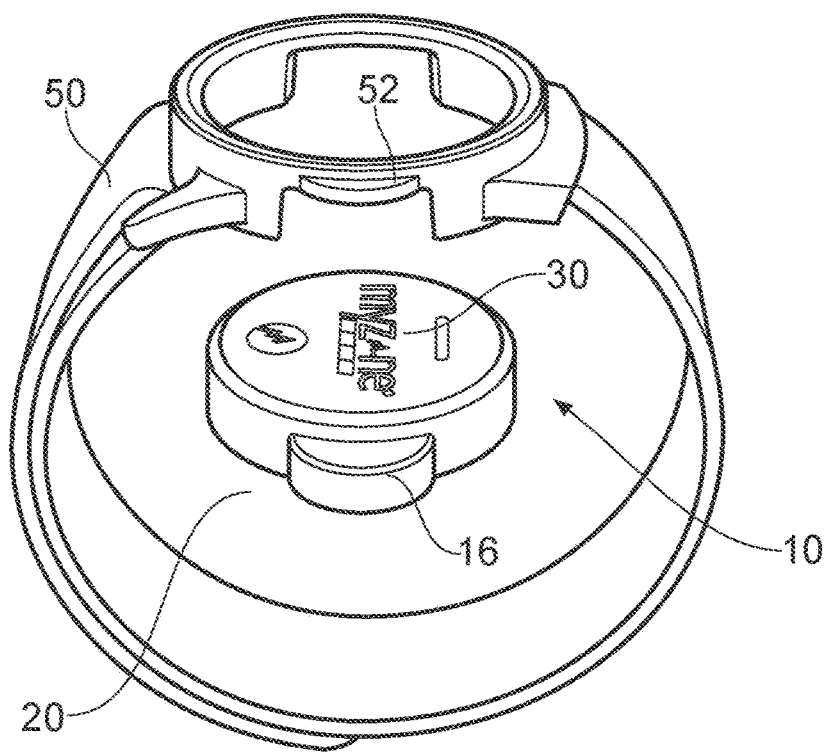
FIGS. 2A and 2B are perspective views of the wearable device of FIG. 1 illustrating how the wearable device can be reversibly attached to a wrist strap.
Figure 2B:
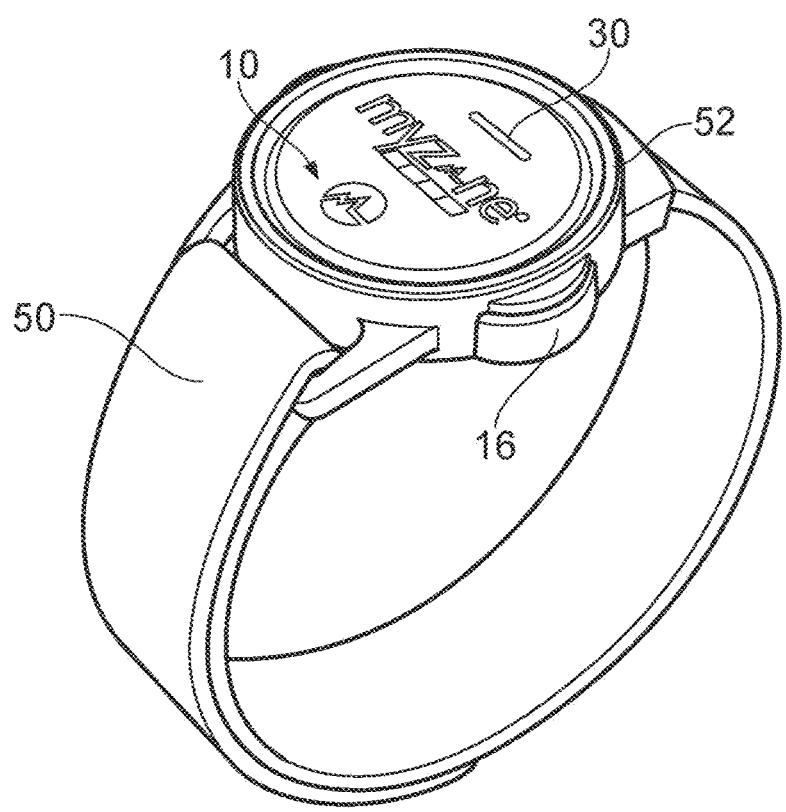

As shown in FIGS. 2A and 2B, wearable device 10 is reversibly attachable to a wrist strap 50 for attaching the wearable device 10 to a user's wrist. Specifically, the wrist strap 50 may comprise a frame 52 which receives, and forms a snap-fit engagement with the wearable device 10 to lock the wearable device 10 to the wrist strap 50. Frame 52 and wearable device 10 comprise complementary interlocking grooves and protrusions for locking the wearable device within the frame 52. The frame 52 may also comprise a release mechanism for releasing the wearable device 10 from the frame 52. Accordingly, a user can easily attach and remove the wearable device 10 to the wrist strap 50.

The wrist strap 50 may comprise any known securing means for attachment to the user's wrist, such as a clasp, or a buckle. Frame 52 may be a plastic injection moulded frame. The wrist strap 50 may comprise an elastic band to strap the wearable device 10 to the user's wrist.

The wearable device 10 also comprises a button 16. In FIGS. 2A and 2B, the button 16 is provided on a transverse edge of the wearable device 10, but it could alternatively be provided on another side of the device 10, such as a front side 30 of the device 10. Preferably, the button 16 is positioned so that it is easily accessible to the user when the wearable device 10 is attached to the user's wrist by the wrist strap 50. The button 16 allows the user to activate a PPG only mode, in which the PPG sensor operates but the ECG sensor is disabled, as discussed in further detail below.

Figure 3:
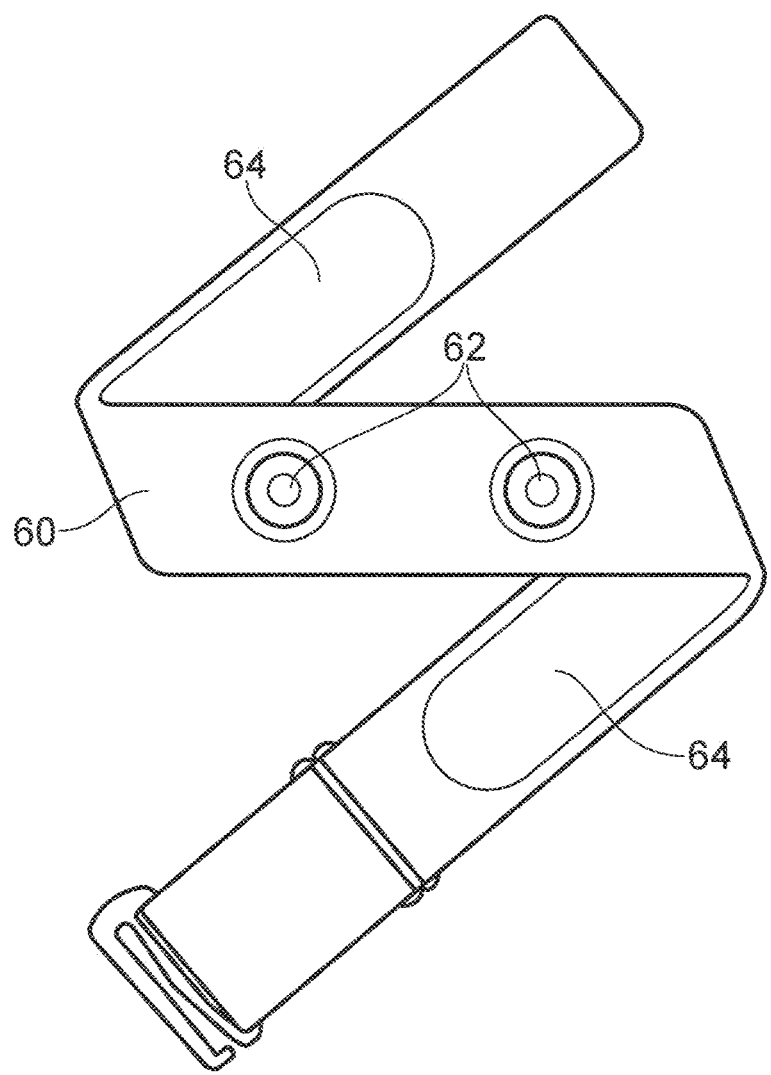
FIG. 3 is a perspective view of a chest strap.

The wearable device 10 is also reversibly attachable to a chest strap 60, which is shown in FIG. 3, and is sized to fit around a user's chest. The chest strap comprises external ECG skin contacts 64 for contacting the user's skin when the chest strap 60 is attached to the user's chest. The chest strap 60 also comprises fasteners 62 for attaching the wearable device 10 to the chest strap 60. Specifically, fasteners 62 comprise a snap-button popper recess, which are each configured to receive a terminal pin 12 of the wearable device 10 to mechanically attach/lock the wearable device 10 to the chest strap 60. The fasteners 62 also electrically connect the terminal pins 12 to the external skin contacts 64, such that when the wearable device 10 is attached to the chest strap 60, and the chest strap 60 is attached to the user's chest, the terminal pins 12 collect ECG measurements from the external skin contacts 64 which are in contact with the user's skin. In order to collect ECG measurements, the terminal pins 12 are attached to the fasteners 62 of the chest strap so that they are in electrical contact with the external ECG skin contacts 64, and therefore the ECG sensor of the wearable device 10 can only collect ECG measurements when the wearable device 10 is attached to the user's chest by the chest strap 60.

Figure 4:
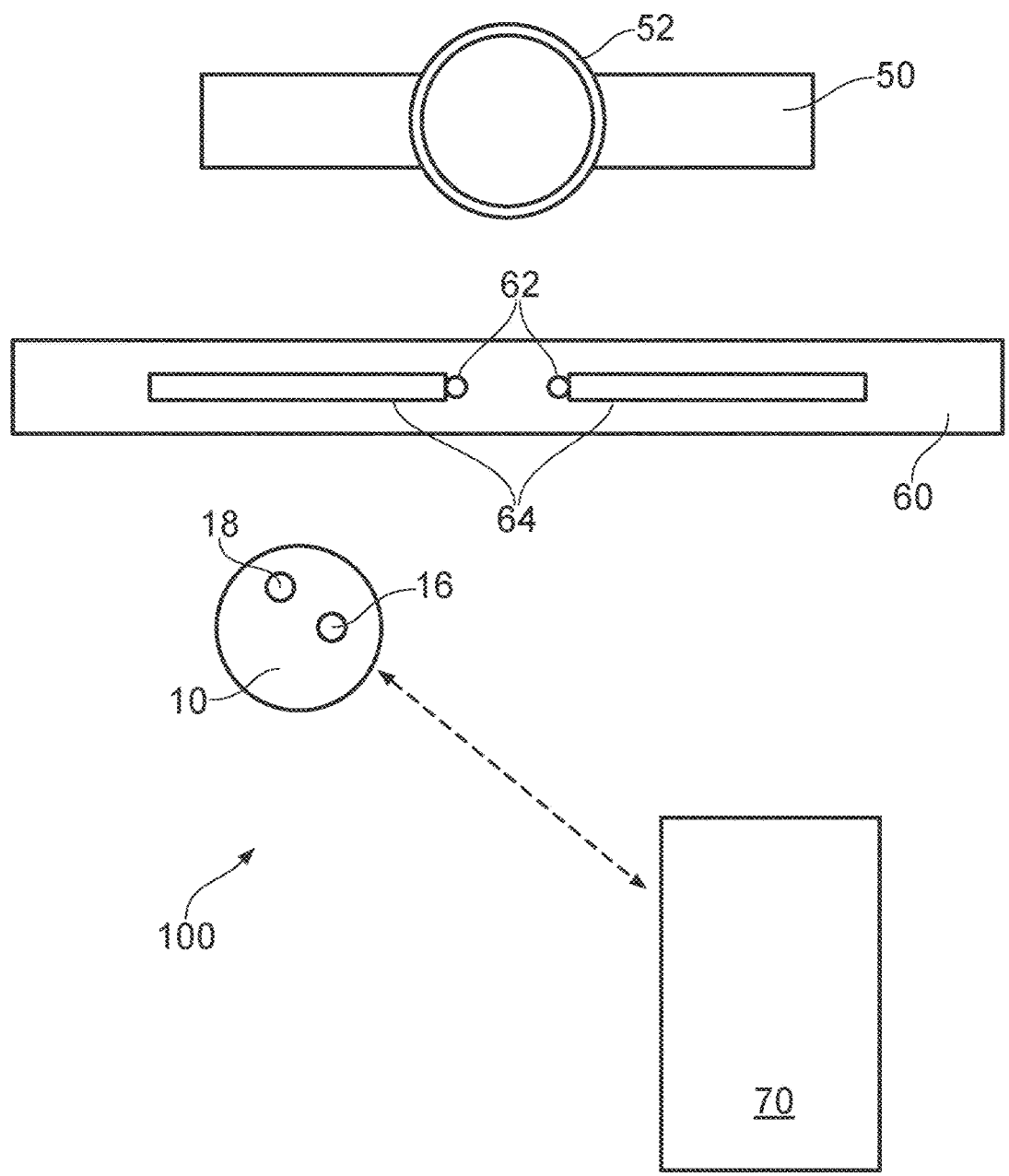
FIG. 4 is a schematic view of a physical activity monitoring system comprising the wearable device of FIG. 1, a wrist strap and a chest strap.

FIG. 4 is a schematic illustration of a physical activity monitoring system 100 including wearable device 10, wrist strap 50 and chest strap 60.

Wearable device 10 is interchangeable between wrist strap 50 and chest strap 60, and thus can be worn on both the user's wrist and chest.

Although not shown in the figures, wearable device 10 also comprises a rechargeable battery and one or both of the terminal pins 12 provides a charging port for connection to an external power supply (not shown). In particular, terminal pins 12 may be arranged to connect to a USB re-charge dongle which can be inserted into a powered USB port to recharge the battery in the wearable device 10. The battery may be a 70 mAh battery having 70 hours of PPG battery life or 120 hours of ECG battery life.

The wearable device 10 may comprise a movement detection unit, such as an accelerometer and/or a gyroscope, for detecting movement of the wearable device 10 and determining/estimating the user's step count, altitude climbed, and/or distance travelled based on the detected movement. The wearable device also comprises a memory for storing ECG and PPG measurements collected by the ECG and PPG sensors, and data collected by the movement detection unit, if present.

The wearable device 10 comprises an LED 18 for indicating that the wearable device 10 is currently operating in the PPG only mode and/or for indicating that the wearable device has successfully switched into the PPG only mode (e.g. from a standby mode in which neither the ECG sensor or the PPG sensor collect measurements). The LED 18 may output a different colour (or a different sequence of flashes) to indicate the current intensity of the exercise being performed by a user, or level of user activity, based on the PPG measurements detected (and optionally ECG measurements). Optionally, the wearable device 10 may comprise a plurality of LEDs, for example two LEDs wherein a first LED of the two LEDs outputs light when the wearable device is in the ECG only mode, and the second LED outputs light when the wearable device is in the PPG only mode.

As shown in FIG. 4, the wearable device is able to wirelessly communicate with one or more external devices, such as a smart phone or an external receiver station. In FIG. 3, the wearable device is configured to wirelessly communicate with a mobile device 70, e.g. a smartphone, having an application installed thereon. The wearable device may also be able to wirelessly communicate with other external receiver stations, such as dedicated units or hubs installed in a fixed location, such as health clubs, workplaces, doctors surgeries and schools. The wearable device may also be able to wirelessly communicate with a remote server (not shown).

The wearable device 10 is configured to transmit data, which includes the stored ECG and PPG measurements, and any detected movement data, to the mobile device 70 (and/or an external receiver station). The application installed on the mobile device 70 can then determine indications of user activity, current intensity of exercise being performed, and/or heart function of the user, such as heart rate, or heart rate recovery value, based on the data received from the wearable device 10. The mobile device 70 may comprise a GPS unit and may use GPS measurements of the mobile device 70 in the calculation of activity, current intensity level, and/or indications of heart function. The GPS unit may also provide feedback to the user via the mobile device independently of the wearable device. For example, the GPS unit may provide feedback to the user on the distance travelled or cadence (speed) of the mobile device 70.

The mobile device 70 and/or external receiver station may display the calculated activity, level of exercise intensity, and/or indications of heart function to the user via a display on the mobile device 70/external receiver station. Alternatively/additionally, the control circuitry may control the LED 18 of the wearable device 10 to output a different colour (or a different sequence of flashes) to indicate the calculated current activity and/or indications of heart function and/or the current intensity of exercise being performed by the user wearing the wearable device 10.

Alternatively, the wearable device 10 itself may calculate activity, current intensity level, and/or indications of heart function based on the data stored in the memory of the mobile device (e.g. the stored ECG/PPG/movement detection unit measurements), and then wirelessly transmit these calculated indications of heart rate function/activity to the application installed on the mobile device 70 (or external receiver station), for display using the mobile device 70/external receiver station.

A method of using the physical activity monitoring system 100 will now be described. A user attaches wearable device 10 to the frame 52 of wrist strap 50 and straps the wearable device 10 to their wrist. Using button 16, the user activates (e.g. initiates, selects, or switches the wearable device 10 into) the PPG only mode. LED 18 indicates to the user (e.g. by flashing green) that the wearable device 10 has successfully activated the PPG only mode. The PPG sensor then collects PPG measurements from the user's wrist. No ECG measurements are collected from the user's wrist. The LED 18 may flash at a different rate, in a different sequence, or in a different colour, depending on the PPG measurements collected from the user's wrist, e.g. to indicate user activity or current intensity of exercise performed by the user.

The PPG measurements are stored in the memory of the wearable device 10 (e.g. when the wearable device 10 is not in range of the mobile device 70 nor an external receiver station). When the wearable device 10 is in range of the mobile device 70 and/or an external receiver station, the wearable device transmits the PPG measurements to the mobile device 70/external receiver station. The mobile device 70/external receiver station can then display data, e.g. indications of the heart rate function, and/or the PPG measurements themselves, to the user.

If the user wishes to take an ECG measurement (which is considered a more accurate measurement of heart rate), the user deactivates the PPG only mode (by using button 16 and/or by allowing the PPG sensor to deactivate through non-use and/or by attaching the device 10 to the chest strap 60). The user then detaches the wearable device 10 from the wrist strap 50, attaches the wearable device 10 to the chest strap 60 using fasteners 62 of the chest strap 60 and terminal pins 12 of the wearable device 10, and attaches the wearable device 10 to their chest using the chest strap 60. When attached to the user's chest, the ECG sensor of the wearable device 10 collects ECG measurements via the external ECG skin contacts 64 on the chest strap 60 and the terminal pins 12 of the ECG sensor. No PPG measurements are collected.

Similarly to the PPG measurements, the ECG measurements can be stored in the memory of the wearable device 10, and transmitted to the mobile device 70 and/or external receiver station for display to the user.

By collecting ECG measurements only from the user's chest, and PPG measurements only from the user's wrist, noise and interference can be reduced, and accuracy of the measurements can be improved.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A wearable device for monitoring physical activity of a user, the wearable device being reversibly attachable to a chest strap and an arm strap, the wearable device comprising:
   an ECG sensor operable to collect ECG measurements of the user only when the wearable device is attached to the user's chest by the chest strap;
   a PPG sensor operable to collect PPG measurements of the user when the wearable device is attached to the user's arm or wrist by the arm strap; and
   control circuitry in communication with the ECG sensor and the PPG sensor, wherein the control circuitry is operable to receive input to switch the wearable device between an ECG only mode and a PPG only mode, wherein:
   in the ECG only mode, the control circuitry is configured to control the ECG sensor to collect ECG measurements and PPG measurements are not collected by the PPG sensor; and
   in the PPG only mode, the control circuitry is configured to control the PPG sensor to initiate PPG measurements and ECG measurements are not collected by the ECG sensor.

2. The wearable device of claim 1, further comprising a user-operated hardware interface in communication with the control circuitry, wherein the user-operated hardware interface is operable to provide, based on receiving a user input, the input to the control circuitry to activate the PPG only mode.

3. The wearable device of claim 2, wherein the user-operated hardware interface is configured to provide the input to deactivate the PPG only mode.

4. The wearable device of claim 2, wherein the user-operated hardware interface is a button.

5. The wearable device of claim 1, wherein the ECG sensor is operable to collect ECG measurements of the user via one or more external ECG skin contacts provided on the chest strap.

6. The wearable device of claim 1, further comprising one or more visual feedback elements operable to provide visual feedback indicating that the wearable device is operating in the PPG only mode and/or that the PPG only mode is activated.

7. The wearable device of claim 1, further comprising a movement detection unit operable to detect movement of the wearable device.

8. The wearable device of claim 1, further comprising a wireless interface operable to wirelessly communicate with one or more external devices.

9. The wearable device of claim 1, wherein the wearable device is operable to determine indications of a heart function of the user based on ECG and/or PPG measurements collected by the ECG and/or PPG sensor, respectively.

10. The wearable device of claim 1, further comprising a charging connection operable to connect to an external power supply for recharging a power source within the wearable device.

11. A physical activity monitoring system, comprising:
a wearable device including:
- an ECG sensor operable to collect ECG measurements of the user only when the wearable device is attached to the user's chest by the chest strap;
- a PPG sensor operable to collect PPG measurements of the user when the wearable device is attached to the user's arm or wrist by the arm strap; and
- control circuitry in communication with the ECG sensor and the PPG sensor, wherein the control circuitry is operable to receive input to switch the wearable device between an ECG only mode and a PPG only mode, wherein:
  - in the ECG only mode, the control circuitry is configured to control the ECG sensor to collect ECG measurements and PPG measurements are not collected by the PPG sensor; and
  - in the PPG only mode, the control circuitry is configured to control the PPG sensor to initiate PPG measurements and ECG measurements are not collected by the ECG sensor;

a chest strap; and
an arm strap, wherein the wearable device is reversibly attachable to the chest strap and the arm strap.

12. A method of using the physical activity monitoring system of claim 11, the method comprising:
- attaching the wearable device to the arm strap and switching the wearable device to the PPG only mode using a user-operated hardware interface of the wearable device;
- removing the wearable device from the arm strap; and
- attaching the wearable device to the chest strap and attaching the chest strap to the user's chest to switch the wearable device into the ECG only mode.

13. The physical activity monitoring system of claim 11, wherein the chest strap comprises one or more external ECG skin contacts for contacting the user's chest.

14. The physical activity monitoring system of claim 11, wherein the arm strap is a wrist strap sized to extend around a user's wrist.

15. A method of monitoring physical activity using the wearable device of claim 1, the method comprising:
- detecting that the wearable device is coupled with the chest strap;
- switching the wearable device to the ECG only mode when the wearable device is attached to the user's chest by the chest strap;
- receiving the input via a user-operated hardware interface of the wearable device; and
- switching the wearable device to the PPG only mode in response to the input via the user-operated hardware interface of the wearable device.

* * * * *